United States Patent
Liu

(10) Patent No.: US 12,130,668 B2
(45) Date of Patent: Oct. 29, 2024

(54) MOTION MECHANISM APPLIED TO INWARD-FOLDING FLEXIBLE SCREEN TERMINAL

(71) Applicant: Hangzhou Amphenol Phoenix Telecom Parts Co., Ltd., Hangzhou (CN)

(72) Inventor: Xiaojie Liu, Hangzhou (CN)

(73) Assignee: HANGZHOU AMPHENOL PHOENIX TELECOM PARTS CO., LTD., Hangzhou (CN)

( * ) Notice: Subject to any disclaimer, the term of this patent is extended or adjusted under 35 U.S.C. 154(b) by 26 days.

(21) Appl. No.: 17/925,237

(22) PCT Filed: Apr. 26, 2021

(86) PCT No.: PCT/CN2021/089791
§ 371 (c)(1),
(2) Date: Nov. 14, 2022

(87) PCT Pub. No.: WO2021/227854
PCT Pub. Date: Nov. 18, 2021

(65) Prior Publication Data
US 2023/0236635 A1 Jul. 27, 2023

(30) Foreign Application Priority Data

May 12, 2020 (CN) .......................... 202020773511.8

(51) Int. Cl.
*G06F 1/16* (2006.01)
*G09F 9/30* (2006.01)

(52) U.S. Cl.
CPC .......... *G06F 1/1652* (2013.01); *G06F 1/1624* (2013.01); *G06F 1/1681* (2013.01); *G09F 9/301* (2013.01)

(58) Field of Classification Search
CPC .... G06F 1/1652; G06F 1/1624; G06F 1/1681; G09F 9/301; G09F 9/30; H04M 1/0268;
(Continued)

(56) References Cited

U.S. PATENT DOCUMENTS 9,348,450 B1 * 5/2016 Kim .................... H04M 1/0268
10,082,838 B1 * 9/2018 Hong .................... G06F 1/1656
(Continued)

FOREIGN PATENT DOCUMENTS

CN 204533175 U 8/2015
CN 108922408 A 11/2018
(Continued)

*Primary Examiner* — Rockshana D Chowdhury
(74) *Attorney, Agent, or Firm* — Muncy, Geissler, Olds & Lowe, P.C.

(57) ABSTRACT

The present invention provides a motion mechanism applied to an inward-folding flexible screen terminal, comprising an intermediate support structure, left and right support structures, and left and right movable support plates. The intermediate support structure is provided with a synchronous reverse rotation connecting mechanism. The left and right movable support plates are rotatably connected to the left and right support structures at the intermediate support structure, respectively. Rotation of the left and right movable support plates can be directly planned according to the relationship between gears and racks, and the gear indexing circle diameter can be increased in finite space by using virtual center design, so that the racks are driven to generate a larger sliding distance by rotating a small angle, i.e., sliding a chassis to increase the accommodating space of the screen closed state. Moreover, the effect of accurately controlling sliding is also achieved, and designing a certain transmission ratio by means of the principle of gear and rack transmission to realize the design of the rotation angle can produce the required sliding amount.

10 Claims, 3 Drawing Sheets

(58) Field of Classification Search
CPC ......... H04M 1/022; F16C 11/04; F16C 11/10; F16C 11/12
See application file for complete search history.

(56) References Cited

U.S. PATENT DOCUMENTS

| | | | | |
|---|---|---|---|---|
| 10,317,934 | B2* | 6/2019 | Hampton | G06F 1/1601 |
| 10,423,019 | B1* | 9/2019 | Song | G06F 1/1652 |
| 10,520,992 | B1* | 12/2019 | Chang | H05K 5/0226 |
| 10,550,880 | B2* | 2/2020 | Hsu | E05D 11/082 |
| 10,761,573 | B2* | 9/2020 | Hsu | G06F 1/1681 |
| 10,768,667 | B2* | 9/2020 | Lin | H04M 1/0268 |
| 10,955,880 | B2* | 3/2021 | Wang | G06F 1/1681 |
| 11,194,366 | B2* | 12/2021 | Cheng | G06F 1/1626 |
| 11,223,710 | B2* | 1/2022 | Cheng | H04M 1/0268 |
| 11,294,431 | B2* | 4/2022 | Torres | E05D 3/06 |
| 11,385,686 | B2* | 7/2022 | Ai | G06F 1/1616 |
| 11,550,367 | B2* | 1/2023 | Lin | G06F 1/1681 |
| 11,615,720 | B2* | 3/2023 | Park | G06F 1/1652 |
| | | | | 361/679.01 |
| 11,729,932 | B2* | 8/2023 | Yun | G06F 1/1652 |
| | | | | 361/807 |
| 11,768,524 | B2* | 9/2023 | Siddiqui | G06F 1/1656 |
| | | | | 361/679.01 |
| 11,778,764 | B2* | 10/2023 | Zhang | G06F 1/1681 |
| | | | | 361/807 |
| 11,832,405 | B2* | 11/2023 | Zhang | F16C 11/04 |
| 11,856,721 | B2* | 12/2023 | Cheng | H04M 1/0268 |
| 2018/0279489 | A1* | 9/2018 | Ochi | H05K 5/0004 |
| 2019/0033925 | A1* | 1/2019 | Hong | E05D 7/00 |
| 2019/0166703 | A1* | 5/2019 | Kim | H05K 5/0226 |
| 2019/0274227 | A1 | 9/2019 | Hsu et al. | |
| 2020/0103935 | A1* | 4/2020 | Hsu | G06F 1/1681 |
| 2020/0166974 | A1* | 5/2020 | Ai | H04M 1/0216 |
| 2020/0272200 | A1* | 8/2020 | Hou | H04M 1/022 |
| 2021/0044682 | A1* | 2/2021 | Liu | H04M 1/0268 |
| 2021/0067614 | A1* | 3/2021 | Cheng | G06F 1/1681 |
| 2021/0076520 | A1* | 3/2021 | Yen | H04M 1/022 |
| 2021/0267076 | A1* | 8/2021 | Zhang | G06F 1/1652 |
| 2021/0375165 | A1* | 12/2021 | Feng | G09F 9/301 |
| 2023/0180408 | A1* | 6/2023 | Feng | H10K 77/111 |
| | | | | 361/807 |
| 2023/0337380 | A1* | 10/2023 | Ye | G06F 1/1652 |

FOREIGN PATENT DOCUMENTS

| | | |
|---|---|---|
| CN | 108999882 A | 12/2018 |
| CN | 208651418 U | 3/2019 |
| CN | 208656822 U | 3/2019 |
| CN | 110873117 A | 3/2020 |
| CN | 210178745 U | 3/2020 |

* cited by examiner

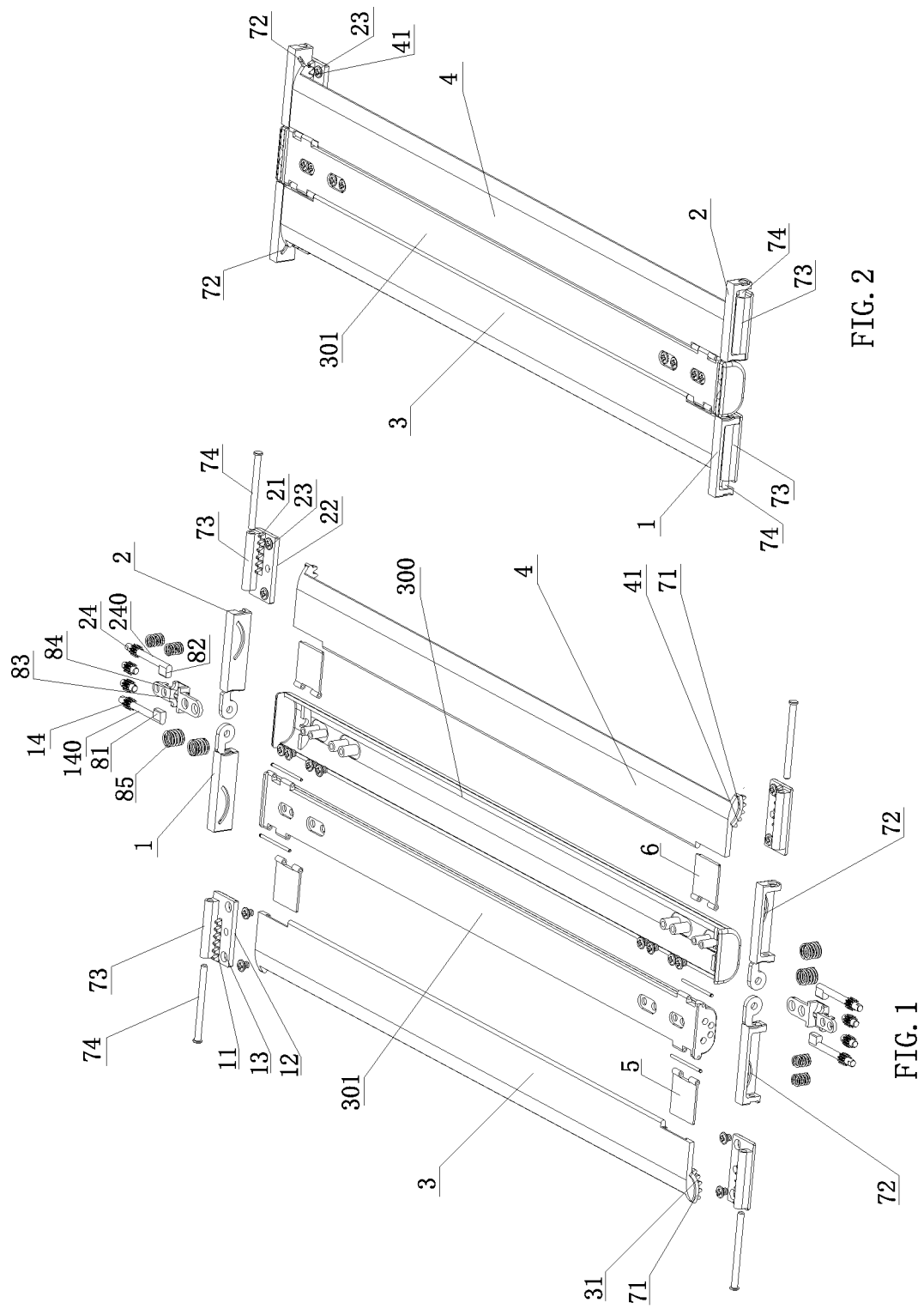

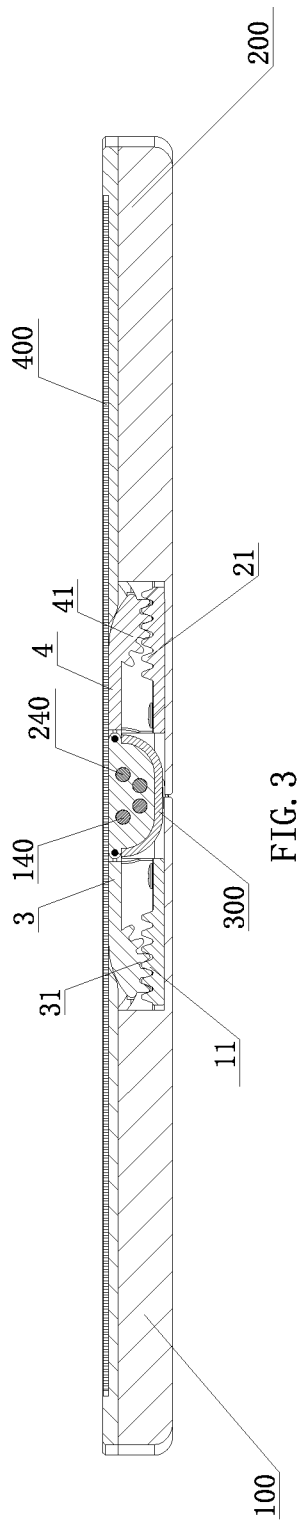
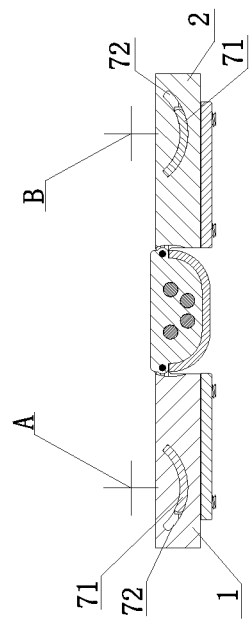
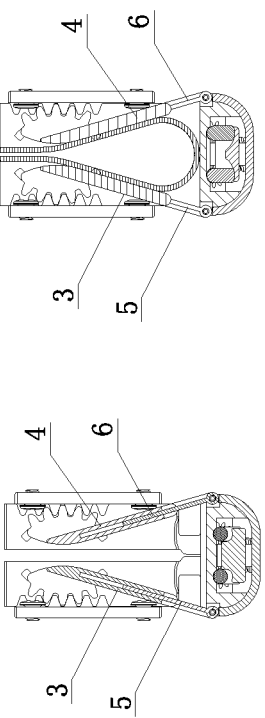
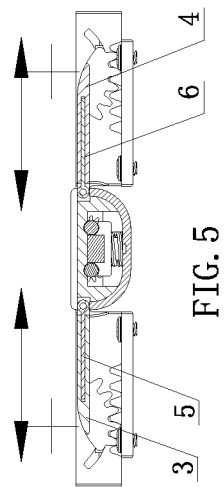
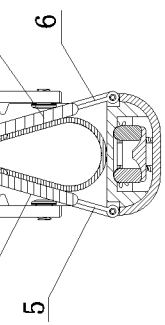
FIG. 3
FIG. 4
FIG. 5
FIG. 6
FIG. 7

MOTION MECHANISM APPLIED TO INWARD-FOLDING FLEXIBLE SCREEN TERMINAL

FIELD OF THE INVENTION

The present invention relates to flexible screen terminals such as mobile phones and notebook computers and hinges thereof.

BACKGROUND OF THE INVENTION

For the current inward-folding flexible screen terminals, rotation support plates may be used on the intermediate support structure for some structures, so that the inward-folding flexible screen terminal can be lowered to the bottom of the chassis when it is folded, to provide space for the middle part of the flexible screen to bend; when the inward-folding flexible screen terminal is flattened, it can be turned to the flexible screen support angle. In order to realize this structure, an inclined groove guide structure is used to guide the rotation of the rotation support plate, but it is easy to interfere with the flexible screen. If the chassis is slidable, the matching of the above guide structure and the chassis is also easy to produce interference with the flexible screen.

SUMMARY OF THE INVENTION

The present invention aims to provide a motion mechanism applied to an inward-folding flexible screen terminal. The motion mechanism facilitates the design of the rotation speed and angle control of rotation support plates so as to meet different requirements. Therefore, the present invention adopts the following technical solutions:

a motion mechanism applied to an inward-folding flexible screen terminal comprises an intermediate support structure, a left support structure and a right support structure, wherein the intermediate support structure is provided with a synchronous reverse rotation connecting mechanism, and the left support structure and the right support structure are connected with the synchronous reverse rotation connecting mechanism so as to realize synchronous reverse rotation. The motion mechanism is further provided with a left movable support plate and a right movable support plate, wherein the left movable support plate and the right movable support plate are rotatably connected to the left support structure and the right support structure at the intermediate support structure. The motion mechanism is characterized in that:

the left movable support plate and the right movable support plate are provided with a first gear and a second gear respectively, wherein the first gear and the second gear are in meshed connection with sliding racks on the left support structure and the right support structure respectively, the sliding direction of the sliding racks is perpendicular to a rotation axis of the left support structure and a rotation axis of the right support structure, the rotation axis of the first gear and the rotation axis of the left movable support plate relative to the left support structure are collinear, and the rotation axis of the second gear and the rotation axis of the right movable support plate relative to the right support structure are collinear.

On the basis of the above technical solution, the present invention also can adopt the following further technical solutions or combine these further technical solutions.

The motion mechanism is further provided with a left connecting structure and a right connecting structure, wherein one end of the left connecting structure and one end of the right connecting structure are respectively rotatably connected with the left side and the right side of the intermediate support structure, and the other end of the left connecting structure and the other end of the right connecting structure are glidingly connected with the left movable support plate and the right movable support plate.

The left connecting structure and the right connecting structure are rotatably connected with the parts, near the top, of the left end and the right end of the intermediate support structure.

The rotation connecting structure of the left movable support plate and the left side support structure and the rotation connecting structure of the right movable support plate and the right support structure both are of matching structures formed by circular arc slide blocks and circular arc guide rails, and the center of the left circular arc slide block and the left circular arc guide rail and the center of the right circular arc slide block and the right circular arc guide rail are respectively positioned above the support surface of the left movable support plate and the support surface of the right movable support plate.

Sliding racks on the left support structure and the right support structure are connected to a left sliding connection structure on the left support structure and a right sliding connection structure on the right support structure respectively, and the left sliding connection structure and the right sliding connection structure are arranged at the parts connected with a left chassis and a right chassis of the inward-folding flexible screen terminal respectively.

The left sliding connection structure and the right sliding connection structure are arranged on the left support structure and the right support structure through sliding guide structures respectively.

A locking structure is further arranged in the intermediate support structure and is capable of locking the left support structure and the right support structure when the inward-folding flexible screen terminal is in a flattened state, or locking a structure synchronously rotating with the left support structure and the right support structure so as to keep the current state.

A structure for increasing resistance when the inward-folding flexible screen terminal is rotatably opened and folded is arranged in the intermediate support structure.

The structure for increasing resistance when the inward-folding flexible screen terminal is rotatably opened and folded is arranged in the intermediate support structure so that a function of stopping rotation at any time and positioning at any time is provided.

The structure for increasing resistance when the inward-folding flexible screen terminal is rotatably opened and folded is combined with the locking structure.

By adopting the technical solution of the present invention, the motion mechanism is simple in structure. Rotation of the movable support plates can be directly planned according to the relationship between the gears and the racks, and the gear indexing circle diameter can be increased in finite space by using virtual center design, so that the racks are driven to generate a larger sliding distance by rotating a small angle, i.e., sliding a chassis to increase the accommodating space of the screen closed state. Moreover, the effect of accurately controlling sliding is also achieved, and designing a certain transmission ratio by means of the principle of gear and rack transmission to realize the design of the rotation angle can produce the required sliding amount.

BRIEF DESCRIPTION OF THE DRAWINGS

FIG. 1 is an exploded view of an embodiment of a motion mechanism provided by the present invention.

FIG. 2 is a schematic diagram of an embodiment of a motion mechanism provided by the present invention.

FIG. 3 is a schematic diagram of an embodiment of an inward-folding flexible screen terminal provided by the present invention in a flattened state.

FIG. 4 is a schematic diagram I illustrating the matching of a partial structure in a motion mechanism under the state shown in FIG. 3.

FIG. 5 is a schematic diagram II illustrating the matching of a partial structure in a motion mechanism under the state shown in FIG. 3.

FIG. 6 is a schematic diagram illustrating the matching state of the structure in FIG. 5 when an inward-folding flexible screen terminal is turned to the folded state.

FIG. 7 is a schematic diagram of a partial structure of an inward-folding flexible screen terminal when turned to the folded state.

DETIALED DESCRIPTION

Figure 8:
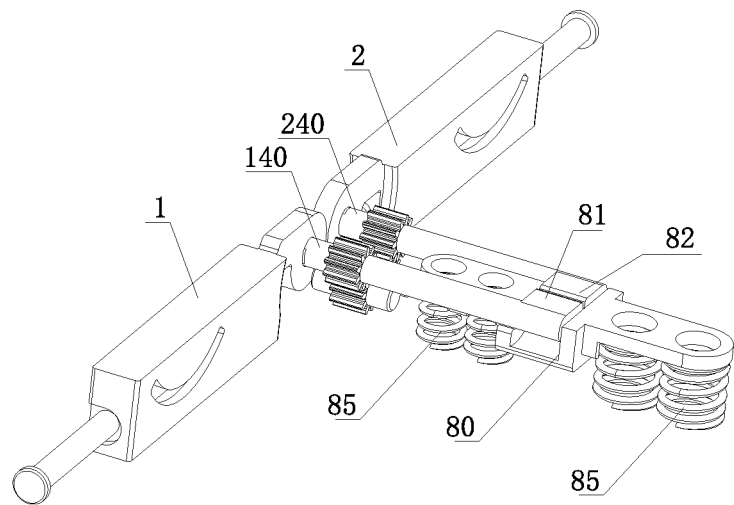
FIG. 8 is a schematic diagram of a partial structure of a motion mechanism embodiment provided by the present invention, showing a locking structure, a synchronous reverse rotation connecting structure and a structure for increasing resistance when the flexible screen terminal is rotatably opened and folded.
Figure 9:
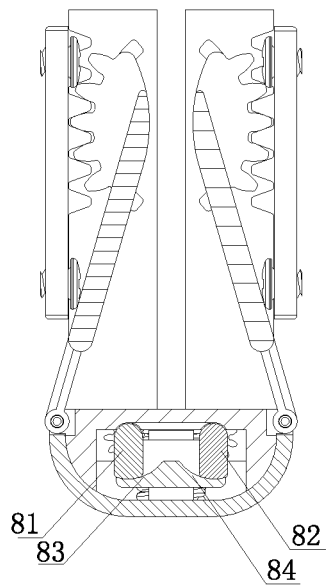
FIG. 9 is a schematic diagram of a motion mechanism embodiment provided by the present invention in a locked state.
Figure 10:
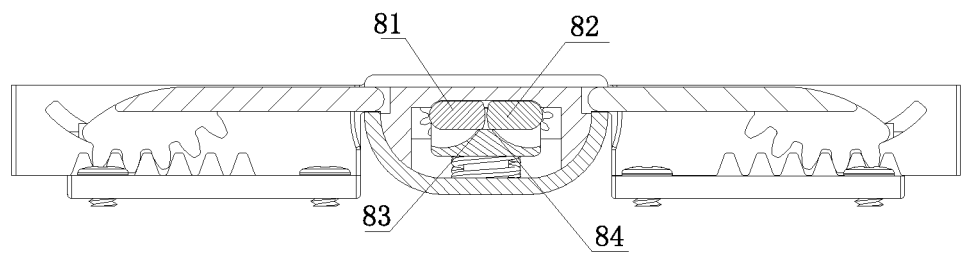
FIG. 10 is a schematic diagram of a motion mechanism embodiment provided by the present invention in an unlocked state.

As shown in the accompanying drawings, a motion mechanism applied to an inward-folding flexible screen terminal provided by the present invention comprises an intermediate support structure, a left support structure 1 and a right support structure 2, wherein the intermediate support structure generally comprises an intermediate chassis 300 of the terminal, and fixing parts such as a connecting frame and a base which are arranged in the intermediate chassis 300, and can also comprise a flexible screen intermediate support plate 301 arranged on the top of the intermediate chassis 300 when necessary.

A synchronous reverse rotation connecting mechanism is also arranged in the intermediate chassis 300, and the left support structure 1 and the right support structure 2 are connected with the synchronous reverse rotation connecting mechanism to realize synchronous reverse rotation.

The motion mechanism is also provided with a left movable support plate 3 and a right movable support plate 4, wherein the left movable support plate 3 and the right movable support plate 4 are rotatably connected to the left support structure 1 and the right support structure 2 at the intermediate support structure; and when the inward-folding flexible screen terminal is unfolded, the left movable support plate 3 and the right movable support plate 4 are just connected outside two sides of the flexible screen intermediate support plate 301.

The left movable support plate 3 and the right movable support plate 4 can respectively revolve along with the left support structure 1 and the right support structure 2 and can also respectively rotate a certain angle around own axes relative to the left support structure 1 and the right support structure 2, thus providing an avoiding space for bending the middle of a flexible screen 400.

The left movable support plate 3 and the right movable support plate 4 are provided with a first gear 31 and a second gear 41 respectively, wherein the first gear 31 and the second gear 41 both are sector gears and are in meshed connection with sliding racks 11 and 21 on the left support structure 1 and the right support structure 2 respectively, the rotation axis of the first gear 31 and the rotation axis of the left movable support plate 3 relative to the left support structure 1 are collinear, and the rotation axis of the second gear 41 and the rotation axis of the right movable support plate 4 relative to the right support structure 2 are collinear.

The motion mechanism is further provided with a left connecting structure 5 and a right connecting structure 6, wherein one end of the left connecting structure 5 and one end of the right connecting structure 6 are rotatably connected with the intermediate support structure, preferably rotatably connected with the upper portions of the left end and the right end of the intermediate support structure, e.g., rotatably connected with the left side and the right side of the intermediate support plate 301. The other end of the left connecting structure 5 and the other end of the right connecting structure 6 are in sliding connection with the left movable support plate 3 and the right movable support plate 4.

The rotation connecting structure of the left movable support plate 3 and the left side support structure 1 and the rotation connecting structure of the right movable support plate 4 and the right support structure 2 both are of matching structures formed by circular arc slide blocks 71 and circular arc guide rails 72, and in addition, the center A of the left circular arc slide block 71 and the left circular arc guide rail 72 and the center B of the right circular arc slide block 71 and the right circular arc guide rail 72 are respectively positioned above the support surface of the left movable support plate 3 and the support surface of the right movable support plate 4 (namely, above the top surface of the inwardly folded flexible screen terminal when it is flattened). The gear indexing circle diameter can be freely designed by using virtual center design, and the gear indexing circle diameter can be increased in finite space, so that the racks 11 and 21 are driven to generate a larger sliding distance by rotating a small angle.

Sliding racks 11, 21 on the left support structure and the right support structure are connected to a left sliding connection structure 12 on the left support structure 1 and a right sliding connection structure 22 on the right support structure 2 respectively, and the left sliding connection structure 12 and the right sliding connection structure 22 are arranged at the parts 13, 23 connected with a left chassis 100 and a right chassis 200 of the inward-folding flexible screen terminal respectively, for example, the parts for screw connection. Under this condition, a left chassis 100 and a right chassis 200 can rotate or slide.

The left sliding connection structure 12 and the right sliding connection structure 22 are arranged on the left support structure and the right support structure through sliding guide structures respectively. Sliding guide structures can be sliding sleeves 73 and guide rods 74.

The synchronous reverse rotation connecting structure can be a gear transmission structure, and is provided with four gears which are meshed in sequence respectively, wherein the left support structure 1 and the right support structure 2 are connected with the leftmost gear 14 and the rightmost gear 24 respectively, and can also be connected with the gears 14 and 24 through the connection of gear shafts 140 and 240.

A locking structure is further arranged in the intermediate support structure and is capable of locking the left support structure and the right support structure when the inward-folding flexible screen terminal is in a flattened state, or locking a structure synchronously rotating with the left support structure and the right support structure so as to keep the current state. The locking structure can be composed of rotatable left and side locking blocks 81 and 82, and left and right cam surfaces 83 and 84 which are matched with the left and right locking blocks 81 and 82 respectively, wherein the left and right locking blocks 81 and 82 are connected to the gear shafts 140 and 240 respectively; the left and right cam surfaces 83 and 84 are arranged on a lifting block 80, and are pressed by springs 85 to be matched with the left side and right side locking blocks 81 and 82; therefore, the locking blocks are in friction fit with the cam surfaces to form a structure for increasing resistance when the inward-folding flexible screen terminal is rotatably opened and folded; and the resistance can be increased and adjusted to realize a function of stopping rotation at any time and positioning at any time.

In the description of the present invention, it should be understood that the terms "one end", "the other end", "outside", "inside", "horizontal", "end", "length", "outer end", "left", "right", etc. that indicate the orientation or positional relationship are based on the orientation or positional relationship shown in the accompanying drawings, only for the convenience of describing the present invention and simplifying the description, rather than indicating or implying that the indicated device or element must have a particular orientation, construction and operation in a particular orientation, and therefore should not be construed as limiting the present invention. The terms "first", "second" are also used for brevity of description only, and do not indicate or imply relative importance.

The above descriptions only describe the specific embodiments of the present invention, but the structural features of the present invention are not limited thereto. It is foreseeable that the motion mechanism of the present invention can be applied to various flexible screen mobile terminals. Any changes or modifications made by those skilled in the art within the field of the present invention shall fall within the scope of protection of the present invention.

The invention claimed is:

1. A motion mechanism applied to an inward-folding flexible screen terminal, comprising:
   an intermediate support structure having a synchronous reverse rotation connecting mechanism;
   a left movable support plate and a right movable support plate each rotatably connected to the intermediate support structure and having a first gear and a second gear respectively; and
   a left support structure and a right support structure, rotatably connected with the intermediate support structure via the synchronous reverse rotation connecting mechanism so as to realize synchronous reverse rotation of the left support structure and the right support structure, the left support structure and the right support structure first and second sliding racks respectively, that mesh with the first gear and the second gear respectively;
   wherein the first and second gears are disposed between the inward-folding flexible screen terminal and the first and second sliding racks, respectively,
   wherein a sliding direction of the first and second sliding racks is perpendicular to a rotation axis of the left support structure and a rotation axis of the right support structure, the rotation axis of the first gear and the rotation axis of the left movable support plate relative to the left support structure are collinear, and the rotation axis of the second gear and the rotation axis of the right movable support plate relative to the right support structure are collinear.

2. The motion mechanism applied to an inward-folding flexible screen terminal according to claim 1, wherein the motion mechanism is further provided with a left connecting structure and a right connecting structure, one end of the left connecting structure and one end of the right connecting structure are respectively rotatably connected with the left side and the right side of the intermediate support structure, and the other end of the left connecting structure and the other end of the right connecting structure are glidingly connected with the left movable support plate and the right movable support plate.

3. The motion mechanism applied to an inward-folding flexible screen terminal according to claim 2, wherein the left connecting structure and the right connecting structure are rotatably connected with the parts, near the top, of the left end and the right end of the intermediate support structure.

4. The motion mechanism applied to an inward-folding flexible screen terminal according to claim 1, wherein a rotation connecting structure of the left movable support plate and the left side support structure and a rotation connecting structure of the right movable support plate and the right support structure both are of matching structures formed by circular arc slide blocks and circular arc guide rails, and the center of the left circular arc slide block and the left circular arc guide rail and the center of the right circular arc slide block and the right circular arc guide rail are respectively positioned above the support surface of the left movable support plate and the support surface of the right movable support plate.

5. The motion mechanism applied to an inward-folding flexible screen terminal according to claim 1, wherein sliding racks on the left support structure and the right support structure are connected to a left sliding connection structure on the left support structure and a right sliding connection structure on the right support structure respectively, and the left sliding connection structure and the right sliding connection structure are arranged at the parts connected with a left chassis and a right chassis of the inward-folding flexible screen terminal respectively.

6. The motion mechanism applied to an inward-folding flexible screen terminal according to claim 5, wherein the left sliding connection structure and the right sliding connection structure are arranged on the left support structure and the right support structure through sliding guide structures respectively.

7. The motion mechanism applied to an inward-folding flexible screen terminal according to claim 1, wherein a locking structure is further arranged in the intermediate support structure and is capable of locking the left support structure and the right support structure when the inward-folding flexible screen terminal is in a flattened state, or locking a structure synchronously rotating with the left support structure and the right support structure so as to keep the current state.

8. The motion mechanism applied to an inward-folding flexible screen terminal according to claim 1, wherein a structure for increasing resistance when the inward-folding flexible screen terminal is rotatably opened and folded is arranged in the intermediate support structure.

9. The motion mechanism applied to an inward-folding flexible screen terminal according to claim 1, wherein a structure for increasing resistance when the inward-folding flexible screen terminal is rotatably opened and folded is arranged in the intermediate support structure so that a function of stopping rotation at any time and positioning at any time is provided.

10. The motion mechanism applied to an inward-folding flexible screen terminal according to claim 7, wherein the structure for increasing resistance when the inward-folding flexible screen terminal is rotatably opened and folded is combined with the locking structure.

\* \* \* \* \*